W. H. Guild.

Pneumatic Pump.

No. 3,828. Reissued Feb. 8, 1870.

Witnesses;
J. W. Coombs
Laura Holmes

Inventor;
Wm H. Guild

United States Patent Office.

WILLIAM H. GUILD, OF WILLIAMSBURG, NEW YORK.

*Letters Patent No.* 51,175, *dated November* 28, 1865; *reissue No.* 3,828, *dated February* 8, 1870.

IMPROVEMENT IN PNEUMATIC PUMPS

The Schedule referred to in these Letters Patent and making part of the same

*To all whom it may concern:*

Be it known that I, WILLIAM H. GUILD, of Williamsburg, in the county of Kings, and State of New York, have invented certain new and useful Improvements in Vacuum Pumps; and I do hereby declare that the following is a full, clear, and exact description thereof, reference being had to the annexed drawings making part of this specification, in which—

Similar letters indicate corresponding parts of the machine in all the figures.

The object of this invention is to provide for the effective prevention of leakage of the valves of air or vacuum pumps, by keeping them covered with water or wet while closed, and especially to obtain this result by combining with the cylinder a reservoir for water, and an induction and eduction-passage for such water in conjunction with the air, which shall be so arranged that when the eduction air-valves are closed they shall be covered with water, so as to insure the perfect wetting and sealing of such valves and their seats, thus preventing any air from passing them when in this closed position; and, to this end, The invention consists in providing such a reservoir for water, and induction and eduction-passages for the same in conjunction with the air, so combined with the cylinder and piston of an air-pump as to produce the desired result; and in the arrangement of the induction and eduction-passages, and the chambers containing the induction and eduction air-valves; and, further, in the attachment to the induction valve-chamber or chambers of the pump, between the air induction-valve or valves and cylinder, of a pipe or pipes, distinct from the air-induction pipe, for the admission into the pump at each stroke of the piston of a sufficient quantity of water to make up for the loss of the quantity which is unavoidably carried out with air at each stroke of the piston; and, further, in the arrangement of the air-induction chambers, so that all of the air may be expelled from them at each stroke of the piston, as will be more fully described hereinafter.

To enable those skilled in the art to apply my invention, I will proceed to describe it with reference to the drawings.

A is the bed-plate, which supports the horizontally arranged vacuum pump-cylinders B B, and steam-engine by which they are operated.

The cylinder or cylinders B B are covered at each end, inside of the cylinder-heads D, with a valve-plate, *m*, containing the ports *n n* of the eduction-valves *o*, which are situated in a chamber, *r*, formed between the said plate and the cylinder-head by making the inside of the cylinder-head concave.

The valves *o* are of a circular or other suitable form, and arranged in the cylinder-heads, and the ports in each plate *m* are arranged in a concentric circle.

The said valves *o* are represented as made of flexible vulcanized India rubber, and secured at or around the centre, but opening all around the edges.

Each cylinder-head D is provided inside with annular passage-ways, *s*, surrounding the eduction-valve chambers *r*, and communicating therewith at the top by means of an opening, *t*.

Figure 1:
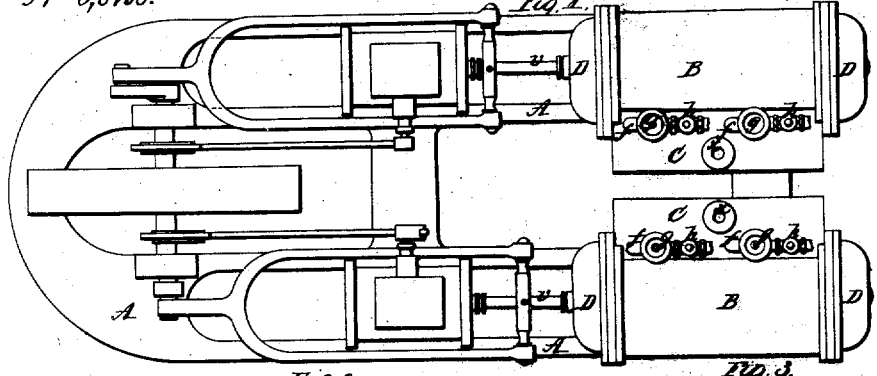
Figure 1 is a plan of two double action vacuum pumps constructed according to my invention, and a double steam-engine, by means of which they are operated.
Figure 2:
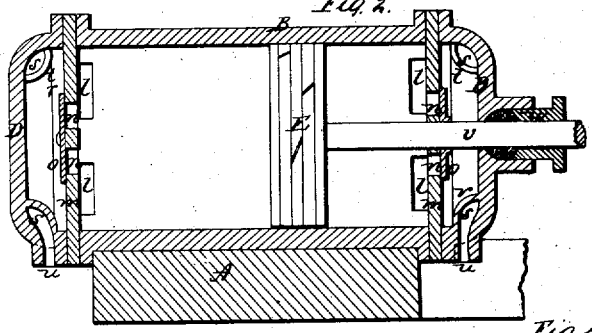
Figure 2 is a longitudinal vertical section on a larger scale than fig. 1 of one of the pump-cylinders.
Figure 3:
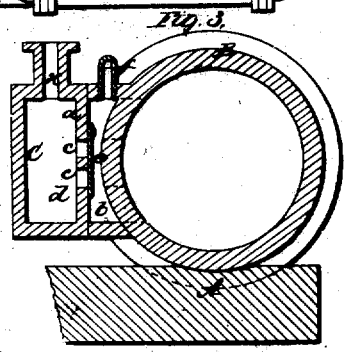
Figure 3 is a vertical transverse section on the same scale as fig. 2.
Figure 4:
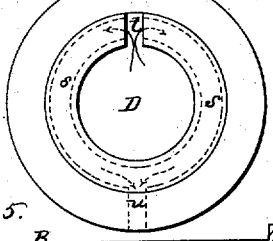
Figure 4 is an inside face view of one of the cylinder-heads.

The said passage-way *s* has an outlet opening, *u*, (see figs. 2 and 4,) at the bottom of the cylinder-head D, where an eduction-pipe is to be attached.

This pipe may lead into the water-tank, from which the pipes *f* take their water, so that the water carried off from the pump with the air may be returned to said tank.

Each of the pump-cylinders has an induction valve-chest, C, on one side thereof.

Figure 5:
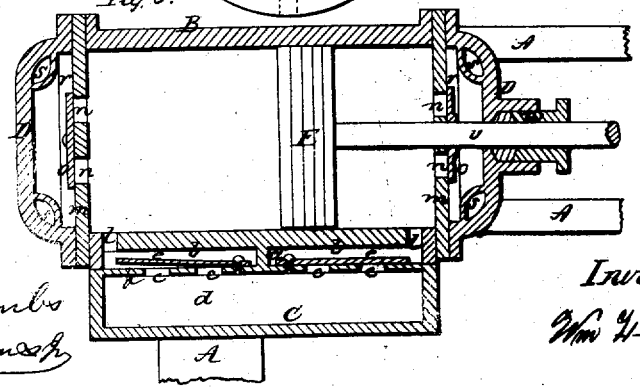
Figure 5 is a central horizontal section of the pump-cylinders and valve-chest.

This valve-chest is divided longitudinally by a partition, *a*, and between this partition and the cylinder it is subdivided transversely by means of central partitions, *a'*, fig. 5, into two valve-chambers, *b b*, which contain the air-induction valves *e e*.

These chambers are located upon the sides of the cylinders, so that their upper portions are below the upper inner surface of the cylinders, as a consequence of which, when the pistons are approaching either end of the cylinder, the water which is in such cylinder flows into said chambers through the openings *l*, thus expelling the air therefrom, and causing it to be discharged from the cylinder at each stroke of the piston.

This arrangement of the chambers *b b* forms an important part of my invention, as it enables me to discharge all of the air from the cylinder and from said chambers at each stroke of the piston, and thus prevent the injurious effects caused by leaving any air in such passages, the effect of which when not expelled, is to retard the formation of the vacuum upon the return stroke of the piston.

From each of these chambers *b b*, a port or ports in the partition *a* communicates with the outer or main induction-chamber *d*, and the induction-valves, which are composed of or faced with India rubber or other elastic or flexible material, are fitted or applied to these ports in such a manner as to open inward or towards the cylinder.

The said chambers *b b* have also communication with the cylinder near the ends thereof, by ports *l l*, fig. 5, which are always open.

The air-induction pipe is connected at *x* with the main induction-chamber *d*.

To each of the valve-chambers *b* there is connected one end of a small water-pipe, *f*, the other end of which may dip into the water in a conveniently-arranged water-tank, from which the water is supplied to the pump for sealing the valves.

Each pipe *f* is furnished with a regulating cock or valve, *g*, and a check-valve, *h*, the valve *g* serving to regulate the quantity of water to be admitted, and the check-valve allowing the water to pass through the pipe *f* into the chamber *b*, but preventing the escape of air and the return of water through said pipe.

E is the piston, fitted into the cylinder B, and packed in any suitable manner.

The piston-rod *v*, to which the piston E is attached, passes at one end of the cylinder B through the valve-plate *m*, and the cylinder-head D, (see figs. 2 and 5,) which for this purpose is provided with a stuffing-box, *w*.

When the piston-rod *v* passes through the valve-plate *m*, that opening should also be provided with proper packing.

The eduction-valve *o* at that end of the cylinder may be so fitted to the cylinder as to constitute a proper packing.

As the steam-engine represented forms no part of this invention, I shall omit a more particular description of it.

The pump may be attached to any kind of well working engine, and it may have two cylinders, as shown in the drawings, or it may have only one such cylinder, in which form it will perform as well.

When the pump is in operation, the air, entering at *x* into the main induction-chamber *d*, presses upon the induction-valve *e* in the chamber *b* communicating with that end of the cylinder from which the piston is moving, and passes through the said chamber and its port or ports *l* into the cylinder, while the air in front of the piston opens the eduction-valve *o*, at that end of the cylinder towards which the piston is moving, and passes through the ports *n n*, eduction-chamber *r* opening *t*, passage *s*, opening *u* and eduction-pipe, the other induction and eduction-valves being in the mean time closed.

During the first few strokes of the piston after starting, the valves or cocks *g* in the water-pipes *f* are kept wide open to admit water enough to fill the induction-valve chambers *b*, and eduction-valve chambers *r*, communicating with each end of the cylinder towards which the piston is moving, as the piston completes its stroke; and when such quantity of water has been admitted, the valves or cocks *g*, are partly closed to reduce the supply of water to what is necessary to make up for what unavoidably passes off with the air at each stroke of the piston. As the piston moves away from either end of the cylinder, the small quantity of water which remained in the cylinder between the piston and eduction-valve plate *m*, at the end of the cylinder, and which filled the corresponding induction-valve chamber *b*, follows the piston along the bottom of the cylinder, accompanied by the small quantity of fresh water which enters through the pipe *f*, port or ports *c*, and induction-valves *e*, belonging to that end of the cylinder; and as the piston moves towards either end of the cylinder, the water in front of it is pushed before it along the lower part of the cylinder, without interfering with the egress of air through the eduction-valve, until the piston has nearly completed its stroke, when the water, rising in the diminished space between the piston and cylinder-head, and being forced out through the ports *l* and *n*, fills the induction-chamber *b* and eduction-chamber *r*, thus expelling the air from the eduction-chamber belonging to that end of the cylinder towards which the piston is moving.

As the piston returns, the eduction-valve closing behind it shuts in the water in the eduction-chamber *r*, behind it, and so keeps the valve *o* of said chambers covered with water and perfectly sealed, the water being prevented from escaping from the said chamber to the eduction-pipe, by reason of outlet *t* being in the upper part of said chamber, and above the valve *o*.

As the piston commences its movement towards either end of the cylinder, the opening of the eduction-valve *o* at that end allows the water to run back, by gravitation, through the ports *n* into the cylinder, and so prevents its interference with the egress of the air.

What I claim as my invention, and desire to secure by Letters Patent, is—

1. In combination with the cylinder, piston, and eduction-valves of an air or vacuum pump, a reservoir for water, and separate induction and eduction-passages for such water, so arranged that the air-eduction valves, when closed, shall be covered, or nearly covered with water, substantially as and for the purpose set forth.

2. In combination with the cylinder, piston, and induction-chamber or chambers of an air or vacuum pump, the pipes *f* for supplying water to such chambers and cylinder, substantially as and for the purpose set forth.

3. Arranging the air-induction valve chambers *b b*, below the upper inner surface of the cylinder, so that the water which is being pushed forward by the piston may be forced into said chambers, and thus expel the air therefrom, substantially as and for the purpose set forth.

4. The arrangement of the main air-induction chamber *d*, induction-valve chambers *b*, induction-valves *e*, and ports *c* and *l*, substantially as herein described, whereby provision is made for covering the said induction-valves with water, as the piston arrives at or approaches their respective end of the cylinder, substantially as and for the purpose set forth.

5. The arrangement of air-eduction chambers *r*, passages *s*, and openings *t* and *u*, in relation to the eduction-valves in the cylinder-heads, substantially as and for the purpose set forth.

6. The water-pipes *f f*, and check-valves *h h*, applied in combination with the induction-valve chamber of an air or vacuum pump, to regulate the induction of water from a suitable reservoir at each stroke of the pump-piston, substantially as and for the purpose set forth.

In testimony whereof, I have signed my name to this specification, before two subscribing witnesses.

WM. H. GUILD.

Witnesses:

J. G. JENKINS,

E. H. ROWLANDSON.